Figure 1:
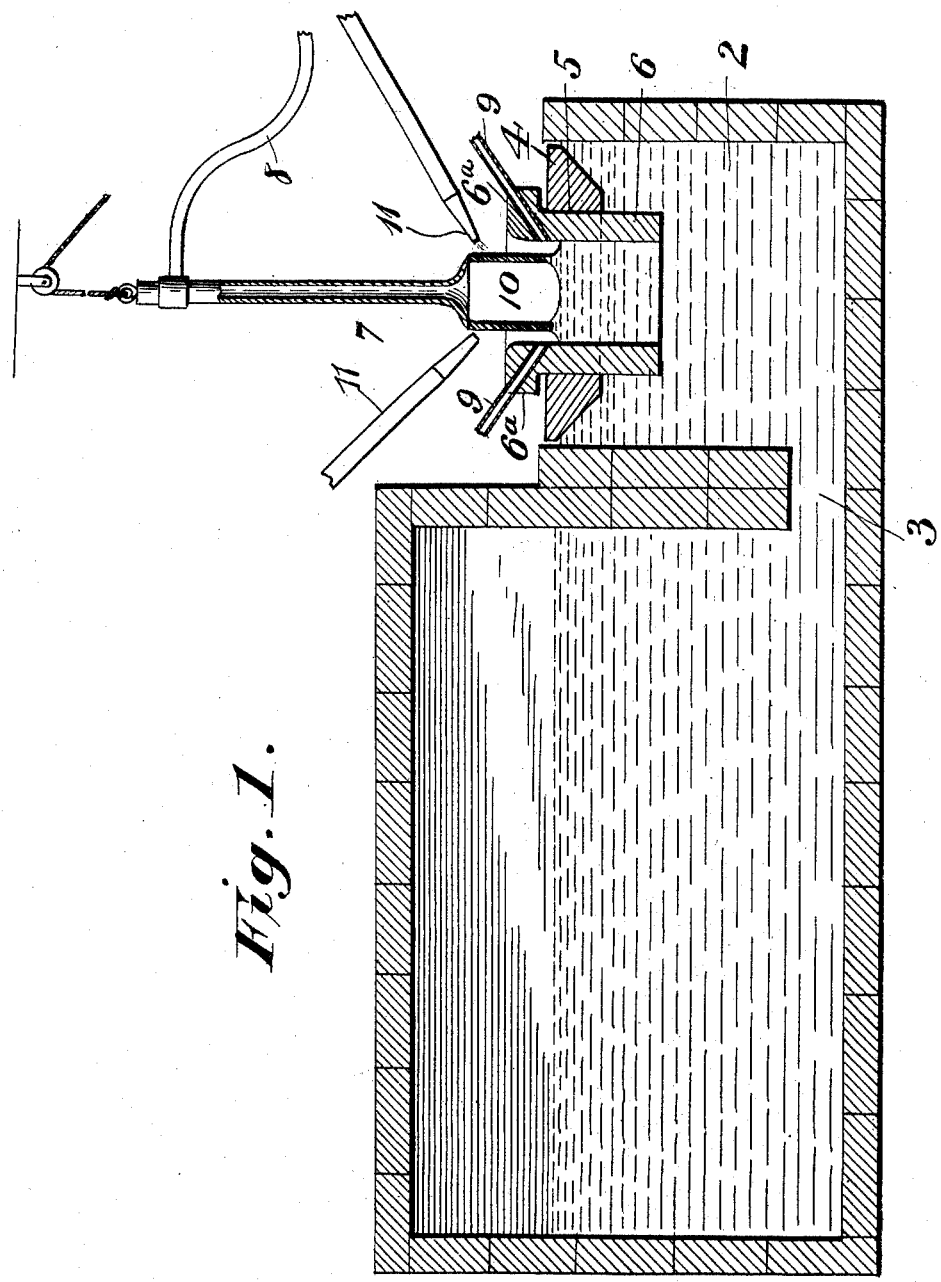

No. 759,159. PATENTED MAY 3, 1904.
H. CRIMMEL.
GLASS DRAWING MACHINE.
APPLICATION FILED JUNE 13, 1903.
NO MODEL. 2 SHEETS—SHEET 1.

No. 759,159. PATENTED MAY 3, 1904.
H. CRIMMEL.
GLASS DRAWING MACHINE.
APPLICATION FILED JUNE 13, 1903.
NO MODEL. 2 SHEETS—SHEET 2.
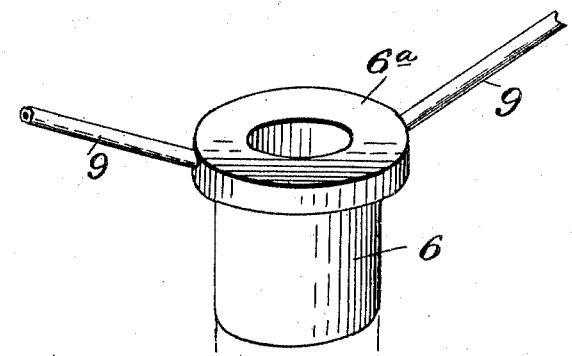
*Fig. 2.*
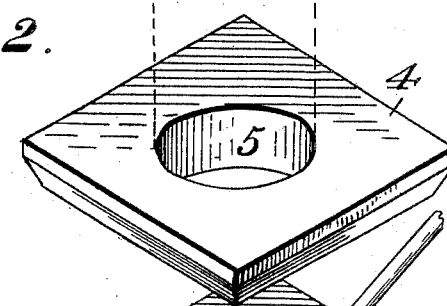
*Fig. 3.*
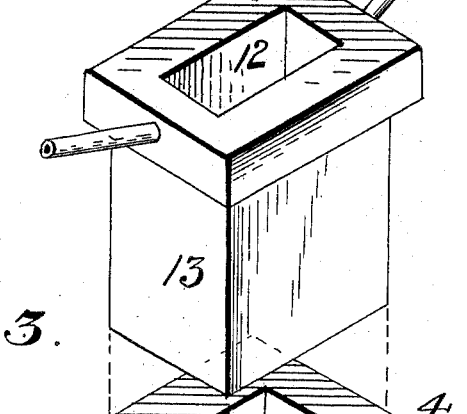

No. 759,159. Patented May 3, 1904.

UNITED STATES PATENT OFFICE.

HENRY CRIMMEL, OF HARTFORD CITY, INDIANA.

GLASS-DRAWING MACHINE.

SPECIFICATION forming part of Letters Patent No. 759,159, dated May 3, 1904.

Application filed June 13, 1903. Serial No. 161,297. (No model.)

*To all whom it may concern:*

Be it known that I, HENRY CRIMMEL, a citizen of the United States, residing at Hartford City, in the county of Blackford and State of Indiana, have invented new and useful Improvements in Glass-Drawing Machines, of which the following is a specification.

My invention relates to improvements in glass blowing or drawing machines; and the objects of the same are, first, to construct a machine which will enable glass to be drawn by the blowpipe or bait from or below the surface of the molten mass; second, to protect the gradually-lengthening cylinder or sheet from the heat of the molten mass, and thereby prevent irregularities in the thickness of the glass.

The simple and novel construction employed by me in carrying out my invention is fully described and claimed in this specification, and illustrated in the accompanying drawings, forming a part thereof, in which—

Figure 1 is a vertical longitudinal section of a glass-furnace with my improvements applied thereto. Fig. 2 is a detail of the floating shield and adjustable sleeve for drawing cylinder glass. Fig. 3 is a detail of a modified form of shield and sleeve with an elongated opening therein for drawing sheet-glass.

The numeral 1 designates a glass-furnace of ordinary form, and 2 an auxiliary reservoir communicating with the furnace 1 by means of a passage 3, which permits the liquid glass to rise and stand in the auxiliary reservoir at a point very near the top thereof.

Mounted in the auxiliary reservoir 2 and floating in the liquid glass therein is a shield 4, formed of fire-clay or any other suitable refractory material and having an aperture 5 therein. A cylindrical sleeve 6, of refractory material, is adjustably mounted in the aperture 5, which it fits snugly. The sleeve 6 is held in position by friction; but clay may be plastered around the outside to hold it, if necessary. A rim $6^a$ is formed thereon to limit its downward movement. A blowpipe 7, having an air connection 8, is suspended above the sleeve 6 and extends down into the same. The pipe 7 is supported by a tackle suitable for raising it as the blowing progresses and for lowering it after a cylinder has been completed. Nozzles 9 are arranged at an inclination to enable each to throw a flame to impinge on the surface of the glass within the drawing-sleeve 6 to serve to reheat the glass or to cut off a blown cylinder 10 from the batch. Conical nozzles 11 are located above the upper end of the sleeve 5 and are connected to a source of cool air under pressure to enable blasts thereof to be directed against the cylinder 10 to cool it and prevent the stretching of the same.

The operation of my device can now be described. After the glass is melted the batch is allowed to flow into the auxiliary reservoir 2. The shield 4 is placed in the reservoir 2 and floats therein, and the sleeve 6 is inserted in the aperture 5, with its lower end extending down into the liquid glass. If the surface of the glass is stiff, the sleeve is lowered, so that the current flowing into the bottom of the sleeve to replace the glass drawn out will always flow from near the center of the reservoir 2, and thus be of a uniform temperature. The blowpipe 7 is then lowered to dip into the glass, the air turned into it, and then raised gradually by the tackle to draw a gradually-lengthening cylinder 10 of glass. As the cylinder lengthens it is cooled by means of air-blasts from nozzles 11 to prevent stretching, and the exposed surface of the batch, if necesssary, is kept heated by blasts from the nozzles 9. When it is desired to cut off the cylinder 10, the blasts from the nozzles 9 are increased, and the lower end of cylinder 10 thereby melted. It should be noted that the cylinder 10 is protected by the floating shield 4 from all heat radiated by the glass in the reservoir 2. If the glass drawn out is found to be too stiff, the sleeve 6 may be lowered to obtain it from nearer the center of the batch.

In the modified form illustrated in Fig. 3 an elongated slot 12 is used instead of a circular aperture 5 and a sleeve 13 to correspond therewith, together with a rod or baits which is lowered in the batch to draw sheet-glass, in which case no air-pressure is used, as in the case of cylinder glass, as above described; but the bait is gradually raised from the bath by a suitable tackle, (not shown,) as in the case of the cylinder of glass.

I do not wish to be limited as to details of construction, as these may be modified in many particulars without departing from the spirit of my invention.

Having thus described my invention, what I claim as new, and desire to secure by Letters Patent, is—

1. In a glass-drawing apparatus, a reservoir adapted to contain molten glass, a float having an opening therethrough and arranged within said reservoir, a sleeve or tube fitting in said float, with its lower portion extending below said float, said sleeve adapted to have inserted therein a blowpipe, and an air-delivering pipe arranged just above said sleeve, to deliver an air-blast upon the cylinder or article.

2. In a glass-drawing apparatus, a reservoir adapted to contain molten glass, a float having an opening therethrough and arranged within said reservoir, a sleeve or tube fitting in said float and having inserted through it inclined flame-delivering nozzles, and means for delivering an air-blast externally to the forming article.

In testimony whereof I have hereunto set my hand in presence of two subscribing witnesses.

HENRY CRIMMEL.

Witnesses:
J. M. BONHAM,
OPAL HACKNEY.